Aug. 2, 1960 E. AZARI ET AL 2,947,538

CARD FEEDING APPARATUS

Filed Feb. 24, 1958 4 Sheets-Sheet 1

INVENTORS:
Eric Azari
Alfred E. Gray
Herman J. Malin
Harold B. Thompson

By Smyth & Roston

Attorneys

Aug. 2, 1960 E. AZARI ET AL 2,947,538

CARD FEEDING APPARATUS

Filed Feb. 24, 1958 4 Sheets-Sheet 2

INVENTORS
Eric Azari
Alfred E. Gray
Herman J. Malin
Harold B. Thompson

By Smyth & Roston
Attorneys

Aug. 2, 1960 E. AZARI ET AL 2,947,538

CARD FEEDING APPARATUS

Filed Feb. 24, 1958 4 Sheets-Sheet 3

INVENTORS:
Eric Azari
Alfred E. Gray
Herman J. Malin
Harold B. Thompson
By Smyth & Roston
Attorneys Aug. 2, 1960 E. AZARI ET AL 2,947,538

CARD FEEDING APPARATUS

Filed Feb. 24, 1958 4 Sheets-Sheet 4

INVENTORS
Eric Azari
Alfred E. Gray
Herman J. Malin
Harold B. Thompson

By Smyth & Roston

Attorneys

United States Patent Office 2,947,538

Patented Aug. 2, 1960

2,947,538

CARD FEEDING APPARATUS

Eric Azari, Pacific Palisades, Alfred E. Gray, Culver City, Herman J. Malin, Los Angeles, and Harold B. Thompson, Playa Del Rey, Calif., assignors to The Magnavox Company, Los Angeles, Calif., a corporation of Delaware Filed Feb. 24, 1958, Ser. No. 717,270

18 Claims. (Cl. 271—11)

The invention relates to card processing apparatus in which information storage cards may be processed to read data recorded on the cards or to write new data on the cards. The invention is more particularly concerned with an improved station for holding the information cards in a stacked condition in such card processing apparatus.

The data stored on the various information storage cards referred to above may be recorded on each card in a variety of different ways. For example, the data may be represented by magnetic areas of first or second polarities, by patterns of holes, or in any other suitable manner. In each instance, the magnetic areas or the holes may be arranged in accordance with a binary code or with any other suitable type of digital code. The present invention will be described in conjunction with the magnetic type of recording. However, it will become obvious as the description proceeds that the improved card holder station of the invention may be used to advantage in any apparatus in which it is desired to hold a stack of information storage cards and to enable such cards to be fed to or from a transport medium against which the station is positioned.

It is usual in data processing apparatus of the type under consideration to transport the information storage cards successively from a card holder station in which they are stacked to a transducer station at which the cards are individually and sequentially processed. After such processing, the cards are transported to the same or to another card holder station in which they are again stacked.

It is desirable that both the card holder stations referred to in the preceding paragraph be reversible. That is, each of the card holder stations should be controllable to function in one operating mode to feed cards successively from the card holder station to the transport medium, and to function in a second operational mode to feed cards from the transport medium into the card holder station. Such reversibility of the card holder stations increases the flexibility of the apparatus and the speed at which it can perform its intended function and can accomplish its intended purpose. Such reversibility permits one of the card holder stations to function as a feeding station and the other as a stacking station during a first card processing operation. Then, and without the need to move the cards bodily back to the first station, such reversible stations permit the cards to be returned by the apparatus from the second station to the first station. One general type of reversible station is described and claimed, for example, in co-pending application 645,639 filed March 12, 1957 for Alfred M. Nelson, et al.

Many problems have been encountered in the provision of a reversible card holder station which will be capable of handling a relatively large number of cards, of feeding the cards successively from the card holder station to the transport medium, and of receiving the cards successively from the transport medium. An important objective of the present invention is to provide an improved reversible card holder station in which such problems are resolved for all practical purposes.

When the card holder station of the type under consideration is conditioned to its feeding mode, it is usually required that the cards in the station be fed in a one-by-one sequence to the transport medium. This is achieved by the provision of a feed head that may be controlled, either to hold the cards in the station, or to allow the cards to be released from the station to the transport medium. The card holder station is constructed so that it defines a throat with the transport medium, and the throat is made just wide enough to allow one card only to be released at a time to the transport medium.

The improved card holder of the invention is constructed to define such a throat with the transport medium. This is achieved by the provision of a tongue extending from the end of the trailing wall of the card holder station into close proximity with the transporting means. This tongue is positioned to engage the leading edge of each card at a point intermediate its top and bottom as it is transferred out of the card holder. This cooperation between the tongue and the cards has been found to precisely control the feed of cards to the transporting means so that one card only is fed at any time, and this is achieved without damaging the cards in any way.

The reversible card holding station of the invention includes a stack head which is movable to an operative position when it is desired to transfer cards from the transport medium to the card holder. The stack head is provided with a central slot or groove which receives the tongue referred to in the preceding paragraph when the stack head is moved to its operative position. This enables the stack head to fill the above described throat when the card holder station is to be operated in its stacking mode, thereby arresting cards carried to it by the transport medium. Such cards are thereby transferred into the card holder station. Such an arrangement enables the width of the stack head to correspond to the width of the cards. Therefore, each card is arrested by the stack head by an impact force extending throughout the entire width of the card. This has been found to be a distinct improvement over prior art arrangements in which the stack head was constructed to move between a pair of spaced throat members. This prior art stack head had a width corresponding only to a portion of the width of the cards. In arresting the cards, the prior art stack head set up shearing stresses in the cards which limited the life of the cards by a material amount. The improved apparatus of the invention has been found to increase the life of the cards more than tenfold.

Card holder stations of the general type with which the invention is concerned usually include a pusher member which is resiliently biased towards the mouth of the station. This pusher serves to hold the cards in the station in a generally stacked condition. It is important that such a pusher move uniformly and easily within the station so that the stack of cards will be urged forward towards the mouth of the station with a constant and uniform pressure. These requirements are achieved in the improved card holder station of the invention by the use of a tapered resilient spring strip which coils about a rotatable bearing on the pusher, and by the use of a polytetrafluoroethylene flat base for the pusher which moves along the floor of the station with a uniform low friction rubbing contact.

The tapered spring strip referred to above provides an increased bias pressure for the pusher with increased distance of the pusher from the mouth of the station. This enables the bias pressure exerted on the cards in the station to decrease as the stack of cards diminishes due to cards being successively fed from the station to the transport medium. The net result is that the leading cards are biased against the mouth of the station by the pusher with substantially the same force, regardless of the number of cards in the station. This follows because a greater force is required to provide a certain bias pressure on the leading cards with a large stack of cards in the station, than that required to provide the same bias pressure with a small stack. This constant bias feature enables a large number of cards to be fed out of the station without creating the undesirable situation of having either too great a pressure on the leading cards when a relatively few cards are in the station, or too little a pressure on the leading cards when a relatively large number of cards are stacked in the station.

The pusher member in the improved station of the invention is also provided with a sponge rubber pad which functions as a shock absorber and enables the cards to be smoothly fed into or out of the station at a relatively fast rate. This pad bears against the stack of cards as the cards are fed into the card holder station, and it helps to prevent damage to the cards during that operation. The rotatably mounted bearing and polytetrafluoroethylene base of the pusher member provide for uniform and smooth motion of the pusher within the card holder station as the cards are fed into and out of the station.

The improved card holder station of the invention is also provided with a feed head, and a vacuum pressure is controllably established at a face of the feed head against which the leading card in the station rests. The feed of cards out of the station can then be controlled by controlling the vacuum pressure provided at that face of the feed head. That is, each time it is desired to release a card from the card holder station, when the station is in its feeding mode of operation it is merely necessary to interrupt the vacuum pressure at the face of the feed head.

It is evident that it is advantageous for the above mentioned face of the feed head to have a relatively high coefficient of friction when it is desired to hold the leading card in the station. However, it is also desirable for the feed head to have a relatively low coefficient of friction when the leading card is to be released since it is usual for the released card to move across the face of the feed head. The above conflict is resolved in the improved card holder station of the invention by providing the face of the feed head with a rubber-like surface having a high coefficient of friction. A plurality of resilient metallic fingers are affixed to the surface, and normally these fingers are displaced out from the surface to hold the leading card away from the surface and so facilitate its release. When the vacuum pressure is exerted at that face of the feed head, however, the leading card is drawn against the surface of the feed head. This causes the fingers to be moved down by that card into grooves in the surface so that the card rests against the rubber-like surface of the feed head.

The feed head, therefore, exhibits a high coefficient of friction with the leading card in the station when it is desired to restrain the cards in the station. This permits the cards to be so restrained without the need for excessive vacuum pressure at the feed head surface. Then, when a card is to be released, the vacuum pressure is interrupted and the resilient fingers move out from the feed head surface. The leading card can now slide off the feed head along the low frictional coefficient fingers.

The above and other features of the invention which are believed to be new are set forth with particularity in the appended claims. The invention itself, however, together with further objects and advantages of the invention, can best be understood by reference to the following description when taken in conjunction with the accompanying drawings in which:

Figure 3:
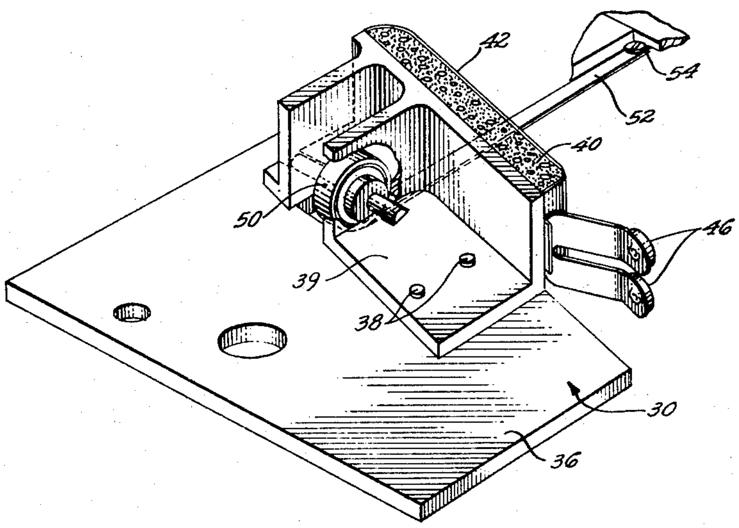
Figure 3 is an enlarged perspective view of a pusher member which serves as a component of the improved card holder station of the invention, this view also illustrating certain elements which cooperate with the improved pusher member assembly of the invention and which serve to bias the member toward the mouth of the card holder station.
Figures 7, 8:
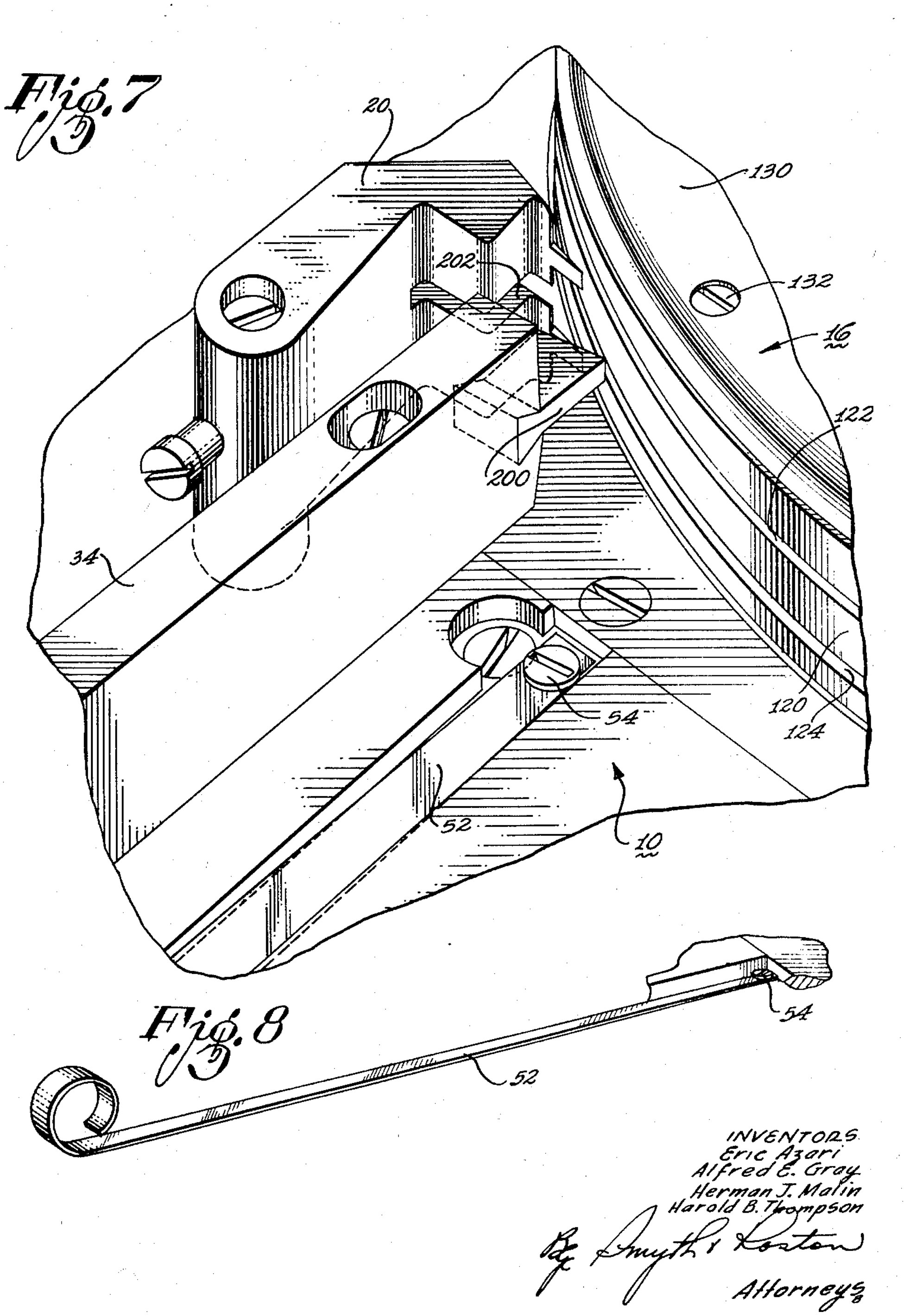

Figure 7 is a perspective fragmentary view of a portion of the improved card holder station of the invention, this view showing more clearly the manner in which a tongue is provided to form a throat for the cards released from the station so that such cards may be released in a one-by-one sequence, and this view also showing a movable stack head which is included in the station and which has a central groove which receives the tongue when the stack head is moved to an operative position; and Figure 8 is a fragmentary view showing a tapered resilient strip which is supported at its narrow end in the station of the invention and which serves to bias the pusher of Figure 3 towards the mouth of the station with the pressure which increases as the distance of the pusher from the mouth increases.

Figure 1:
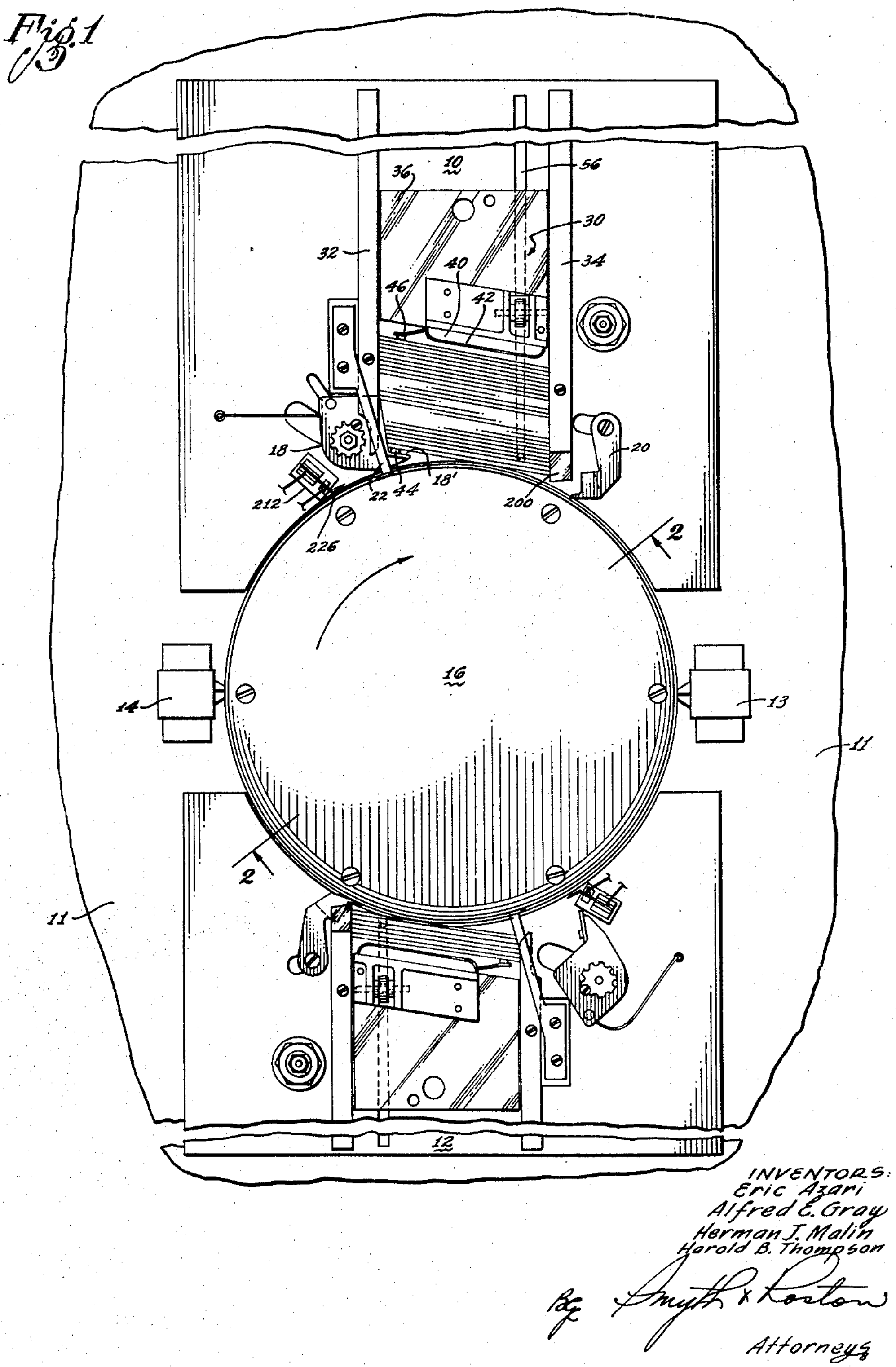
Figure 1 is a top plan view of a simplified data processing apparatus incorporating reversible card holder stations constructed in accordance with the concepts of the present invention, this view illustrating a pair of such reversible feeding-stacking card holder stations disposed contiguous to a rotatable transporting drum and adapted to feed information cards to and from the drum for processing.

In this apparatus of Figure 1, suitable transport means such as a rotatable vacuum pressure drum 16 is provided. The drum 16 is mounted on a horizontal table top 11 for rotation in a clockwise direction about a vertical axis. The drum is constructed in a manner to be described so that it may exert a vacuum pressure at its peripheral surface. This, as noted above, enables the drum to firmly retain the information cards in fixed angular positions about its periphery so that these cards may be transported by the drum. It should be appreciated that the transport means do not necessarily have to be movable in a closed loop such as the drum 16 and actually does not even have to be movable. It is only necessary that the transport means provide a movement of cards in a desired path.

A first card holder station 10 is mounted on the table top 11 with its mouth contiguous the peripheral edge of the drum. A second card holder station 12 is also mounted on the table top 11, and the second card holder is positioned diametrically opposite to the card holder 10. The card holder 12 also has its mouth disposed in contiguous relation to the drum 16.

A first transducer means 13 is mounted on the table top 11, and this transducer means is positioned between the card holding stations 10 and 12. A second transducer means 14 is also mounted on the table top 11, and the second transducer means is positioned on the opposite side of the drum 16 from the transducer means 13. The transducer 13 and 14 may be any suitable and well known type of electromagnetic transducer head or series of heads. For example, these transducer means may be constructed in a manner similar to that described in co-pending application Serial No. 550,296 filed December 1, 1956 by Alfred M. Nelson, et al. The transducer means may also be any other type of head or heads such as mechanical or photoelectric.

The card holder station 10 has a vacuum pressure feed head 18 movably mounted adjacent its leading wall. The card holding station also has a stack head 20 which is movably mounted adjacent its trailing wall. The construction and operation of the feed head 18 and of the stack head 20 may be similar to that described in co-pending application Serial No. 645,639 referred to above. It is believed unnecessary to include a detailed description of the constructional details of these heads in the present application. It should be pointed out, however, that the feed head 18 is controlled to exert a vacuum pressure at its surface 18′ when the card holder station 10 is in its feeding mode and the feed head is in its operative position. The vacuum pressure is exerted on the trailing portion of the leading card in the card holding station. The same leading card rests on the peripheral edge of the drum 16 and the drum also exerts a vacuum force on this card. The stack head 20 is withdrawn to its standby position when the station is in its feeding mode with the feed head 18 in its operative position.

The vacuum force exerted on the face of the leading card by the drum 16 tends to withdraw the leading card from the card holding station 10, whereas the vacuum force exerted on the face of that card by the surface 18′ of the feed head 18 tends to retain that card in the holder. The force exerted by the feed head 18 is made the greater of the two so that this force is able to overcome the force exerted on the card by the drum 16. So long as the leading card is held in this manner in the card holding station, the other cards supported in stacked relationship in the station behind the leading card are also held in place in the station. The cards are so held in the station in a generally stacked relationship with the lower edges of the cards resting on the surface of the table top 11.

Whenever the vacuum pressure to the feed head 18 is momentarily interrupted, the leading card in the card holder is withdrawn by the drum 16. The interval of the interruption in the vacuum pressure to the feed head 18 may conveniently be made such that only one card can be released from the card holding station 10 to the peripheral edge of the drum 16. The next card in the station now comes into the leading position, and it is retained in the card holder station in the manner described until the next interruption of the vacuum pressure to the feed head 18.

It will be evident from the above discussion that when vacuum pressure is exerted at the surface 18′ of the feed head, at which time the leading card is to be retained in the card holding station, it is desirable that the coefficient of friction of the surface of the face 18′ be relatively high. Such a high coefficient of friction permits the leading card to be restrained in the card holding station against the withdrawing force of the vacuum transporting drum 16 without the need for an excessively large vacuum force at the surface 18′. On the other hand, when a card is to be released to the transporting drum 16, it is desirable that a relatively low coefficient of friction exists at the surface 18′ to permit the leading card to slide easily from that surface to the peripheral surface of the transporting drum.

Figures 2, 5, 6:
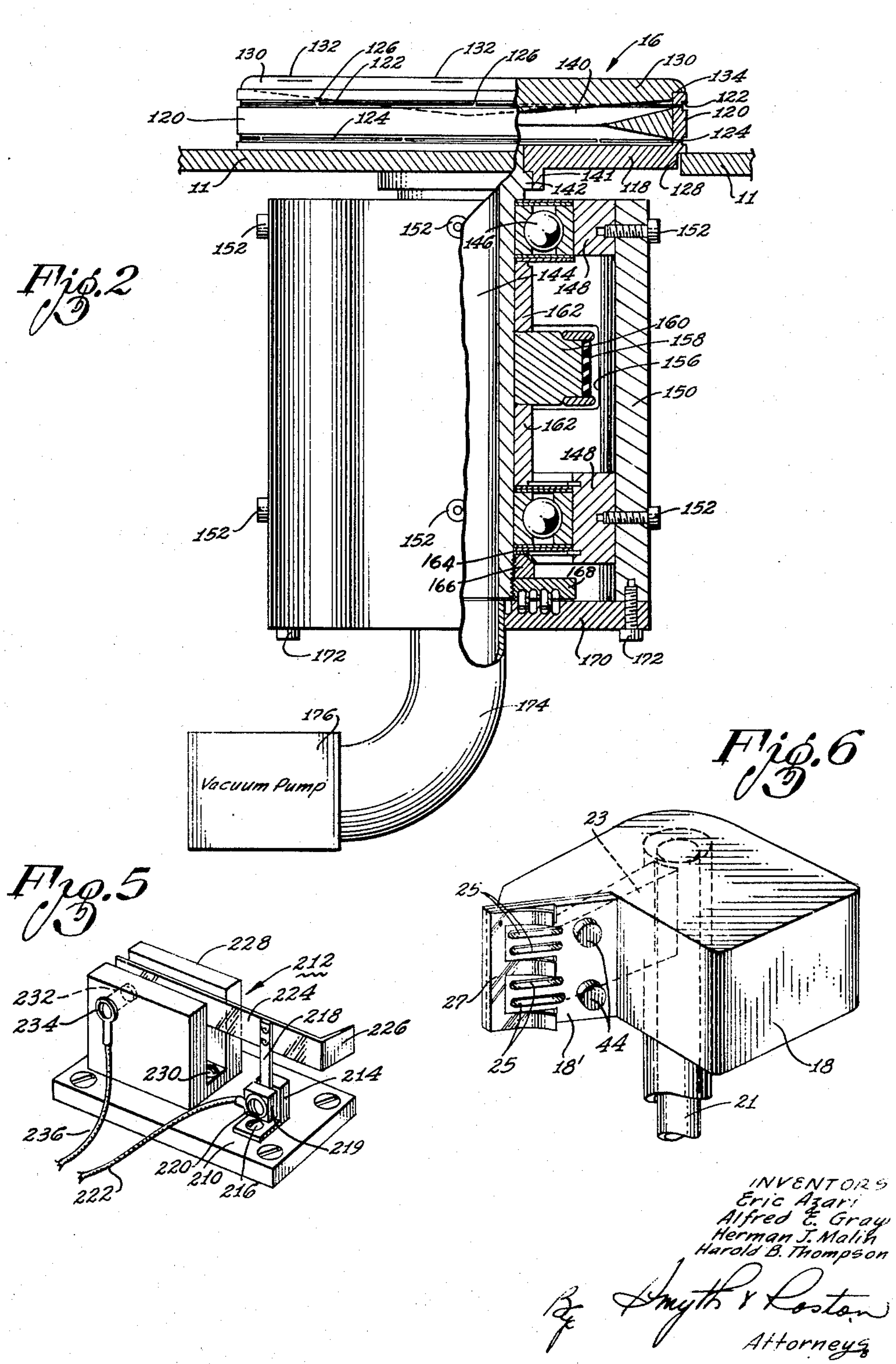
Figure 2 is a sectional view substantially on the line 2—2 of Figure 1 showing the constructional details of the rotatable drum of Figure 1 and the manner in which the drum is able to produce a vacuum pressure at its peripheral surface so that information cards may be rigidly held on that surface for transportation from one card holder station to another.
Figure 5 is a perspective view of a sensing switch that may be mounted adjacent the mouth of the improved card holder of the invention; this switch serving to sense the superimposing of one card over another on the card transporting means, such superimposing indicating a tendency of jamming of the cards, and the sensing switch serving to de-energize the apparatus when such a condition occurs.
Figure 6 is a perspective view of an improved feed head which may be used in the card holder station of the invention, this feed head including a plurality of resilient metallic fingers which serve to facilitate the transfer of cards across the face of the feed head when it is desired to release such cards from the card holder station.

The above criteria are met by the improved feed head of the present invention which is shown in detail in Figure 6. In the illustrated feed head, the surface 18′ may have its face composed of a rubber-like material to provide a relatively high coefficient of friction to the cards supported on that face. Vacuum pressure at the surface 18′ is provided through a feed line 21 and a conduit 23 and through a plurality of orifices 25 extending through that surface.

The rubber-like face of the surface 18′ has a plurality of grooves formed in it, and a plurality of resilient metallic fingers 27 are also supported on that surface. These fingers are normally displaced outwardly from the face of the surface 18′ to move the leading card in the station away from that surface. This means that when such a card is to be released, it slides easily along the low friction metallic fingers 27. However, when a vacuum pressure is exerted through the orifices 25, the leading card is moved down on the surface 18′ and such motion moves the metallic fingers 27 down into grooves in the surface 18′ and below that surface.

Therefore, whenever a vacuum pressure is exerted, the leading card is brought against the rubber-like surface 18′ so that the leading card may be retained in the station by the combined action of the vacuum pressure and the frictional qualities of that surface.

In the stacking operational mode of the card holding station 10, the feed head 18 is withdrawn to its standby position and its vacuum pressure is turned off in the manner explained in the co-pending application referred to above. At the same time, the stack head 20 is moved into proximity with the peripheral surface of the drum 16. When the apparatus is in this latter operational mode, any card transported by the drum is arrested by the stack head.

A pick-off member 22 is mounted adjacent the leading wall of the card holding station. This pick-off member has a series of fingers which extend into peripheral grooves formed about the drum 16, and the stack head 20 has fingers which also extend into these grooves. The fingers of the pick-off member are arcuate in shape and have central portions which are displaced radially outwardly from the periphery of the drum 16. This provides that the cards transported by the drum will ride over the fingers of the pick-off 22 to be lifted outwardly from the periphery of the drum. Also, each card arrested by the stack head 20 will have its trailing edge projecting tangentially to the periphery of the drum and over the fingers of the pick-off 22. The next succeeding card transported by the drum 16 will then ride over the fingers of the pick-off 22 and under the preceding card so as to pry the preceding card from the periphery of the drum. This succeeding card is also arrested by the stack head 20 and the preceding card is deposited by it in the card holder station 10. In this manner, the card holder station is conditioned to its stacking mode in which cards transported by the drum 16 to the stack head 20 are deposited in the station.

The card holder station 12 may be constructed in a manner similar to the construction of the card holder station 10 and, for that reason, its components are not numbered in Figure 1 and will not be individually described. An examination of Figure 1 reveals that the card holder station 10 is illustrated as being in a feeding mode in which the feed head 18 is moved forward to an operational position and the stack head 20 is withdrawn to a standby position. The card holder station 12, on the other hand, is illustrated as being in a stacking mode in which its stack head is moved forward to an operative position and its feed head is withdrawn to a standby position.

The feed head and stack head of the card holder stations 10 and 12 may be operated by an appropriate system of cams and levers. The actual operation of these heads is fully described in the co-pending application, referred to above. Since the actual control of the stack head and feed head for each station does not form a part of the present invention, such a control will not be described in detail. It should be borne in mind, however, that any suitable control can be provided to move the feed heads and stack heads between their operative positions and their standby positions in synchronism and at the proper times.

The card holder station 10 in its feeding mode of operation may contain a plurality of information storage cards supported in the station in a stacked relationship. In the feeding mode, the station 10 is conditioned to controllably feed cards in a one-by-one sequence to the periphery of the drum 16. The card holder station 12 at this time is in its stacking mode so that cards transported to its stack head are deposited in that station. The cards from the card holder station 10 may now be controllably fed to the periphery of the transporting drum 16 and transported by that drum past the transducer means 13 for processing. After processing of the cards by the transducer means 13, they are deposited in the card holder station 12. At the completion of this operation, when the card holder station 10 is empty and all the cards have been transferred to the card holder station 12, the operational modes of the stations 10 and 12 may be reversed so that the cards may be returned in their original order to the card holder station 10. The cards may be further processed by the transducer means 14 as they are so returned to the station 10.

Figure 4:
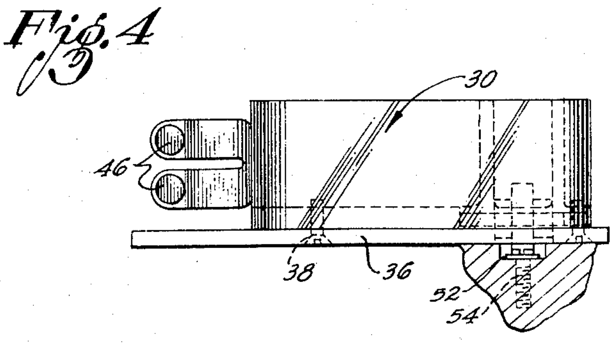
Figure 4 is a front view of the pusher member of Figure 3 illustrating in detail the manner in which a flat low-friction bottom plate is secured to the pusher itself, together with a switch armature and other component parts of the assembly.

As illustrated in Figures 1, 3 and 4 a pusher member 30 is included in the card holder station 10, and a similar pusher member is included in the card holder station 12. The pusher member 30 is adapted to move along the floor of the card holder station 10 between a pair of spaced parallel guide rails 32 and 34 which constitute the leading and trailing side walls of the station. These guide rails are spaced apart a distance corresponding essentially to the length of each card supported in the station. The purpose of the pusher member 30 is to maintain the cards in a stacked relation in the station. To accomplish this purpose, the pusher member is biased in the direction of the mouth of the station resiliently to urge the cards forwardly in the station. This is so that the leading card rests against the surface 18′ of the feed head 18 and against the peripheral surface of the drum 16 when the station is in its feeding mode, and so that the leading card will rest against the stack head 20 and against the pick-off 22 and the peripheral surface of the drum 16 when the station is in its stacking mode.

As cards are fed out of the card holder station 10, the pusher 30 moves forwardly to exert a continuous pressure on the remaining cards and to hold these cards in a stacked relationship in the station. Alternately, when cards are fed into the card holder station 10, the pusher 30 is moved backwardly against its spring pressure so that it still exerts a force on the cards in the station to maintain them in a stacked relationship. The backward movement of the pusher member 30 is also instrumental in facilitating the stacking of additional cards in the station.

The pusher member 30 contains a flat base member 36 composed, for example, of "Teflon" which is the trade name for polytetrafluoroethylene. This material possesses a relatively low coefficient of friction and provides an ideal bearing surface for the pusher against the bottom of the card holder station 10. The pusher includes a bracket 39 which is secured to the base plate 36 by a plurality of screws such as the screws 38. This bracket has an upright portion which supports a sponge rubber pad 40 surrounded, for example, by a flexible thin copper sheath 42. The sponge rubber pad 40 is adapted to form a resilient backing for the copper sheet 42, and the sheet bears against the stack of cards in the card holder station 10. These elements provide a cushion-like shock-absorber surface for the cards to prevent damage as the cards are deposited into the station.

As more clearly shown in Figure 6, the feed head 18 includes a pair of switch contacts 44 on its surface 18′. These switch contacts are engaged by a switch armature 46 carried by the bracket 39. The switch armature 46 serves to short circuit the contacts 44 when the station is empty. At other times, the presence of a card in the station separates the switch armature 46 from the switch contacts 44, as shown, for example, in Figure 1.

The specification of the co-pending application referred to above describes an electrical control circuit which responds to such a switch actuation to provide required controls for the stations. For example, the provision of the switch contacts 44 and switch armature 46 enables a control circuit to reverse the operational modes of the card holder stations of the apparatus of Figure 1 after the last card has left either station. This permits the apparatus of Figure 1 to proceed automatically from one pass to another in the processing of the information storage cards.

The bracket 39 also supports a rotatably mounted ball-bearing assembly 50, and this bearing extends into a slot in the bracket 39 and in the base plate 36. A tapered resilient strip 52 (Figure 8) is supported at its narrow end on the underside of the table top 11 adjacent the mouth of the station by means, for example, of a screw 54. The tapered resilient strip 52 extends upwardly through a slot 56 in the floor of the card holder station 10 and around the peripheral surface of the ball-bearing 50. The strip 52 has a tendency to coil itself into a coiled configuration, and in so doing causes the bearing 50 to rotate and resiliently biases the pusher 30 towards the mouth of the station. The taper on the strip 50 causes it to exert a greater force as the distance of the pressure 30 from the mouth of the station is increased. This provides for a greater force against the stack of cards in the station 10 as the number of cards in the stack increases. This, in turn, provides for a substantially constant biasing force against the leading card in the station. The use of the tapered resilient strip 52 overcomes the problems previously encountered in which the stacked cards in the station were biased with an excessively high force when relatively few were in the station and by an unduly low force when a larger number were stacked in the station. The use of the tapered strip permits a relatively large number of cards to be handled in the station while obtaining the optimum force against the leading card in the station at all times.

The use of the ball-bearing 50, and of the "Teflon" base plate 36, assures that the pusher member 30 will move with a constant and uniform pressure back and forth in the card holder station 10 as the cards move in and out of the station. This prevents any excessive jarring or jamming of the cards as they move in or out of the station.

Details of the vacuum transporting drum 16 are shown in Figure 2. This drum is similar in its construction to the rotatable transporting drum disclosed and claimed in co-pending application Serial No. 600,975 filed July 30, 1956 in the name of Loren R. Wilson.

As shown in Figure 2 the vacuum transporting drum 16 is made up of a lower section and an upper section. The lower section includes a disc-like bottom portion 118 and an annular side portion 120, these portions being integral with one another. A pair of axially spaced peripheral orifices 122 and 124 extend through the side portion 120. Each of these orifices is discontinuous in that it is interrupted at selected intervals about its angular length by ribs 126. The ribs are integral with the side portion 120. The orifices 122 and 124 each has an external peripheral annular channel for receiving the fingers of the pick-off 22 and of the stack head 20 as described above. This engagement of the fingers of these elements with the annular channels in the drum permits the cards to be removed from the periphery of the drum and deposited in either of the stations 10 or 12 in the described manner.

The disc-like bottom portion 118 of the lower section of the drum is undercut, as shown at 128. This is so that the end of this portion will have a reduced diameter with respect to the outer diameter of the annular side portion 120. This enables the edge of the table top 11 to extend beyond the outer limits of the side portion 120. Therefore, even without excessively close tolerances between the edge of the table top 11 and the rotating surface of the drum 16, the cards supported endwise on the table top in the card holder stations 10 or 12 have no tendency to slip down between the table and the drum to become misplaced and damaged.

The upper section of the drum 16 is in the form of a disc-like member 130 which engages the annular side portion 120 of the lower section. The member 130 forms an enclosure with the lower section of the drum, with the member 130 being parallel to the disc-shaped bottom portion 118 of the lower section. The member 130 is held in place on the annular side portion 120 by a series of screws 132.

A deflector ring 140 is supported within the interior of the drum 16 in press-fit with the inner surface of the annular side portion 120. This deflector ring is tapered towards the center of the drum to prevent turbulence and to provide a streamlined path for air that is drawn in through the orifices 122 and 124.

The bottom portion 118 of the lower section of the drum 16 contains a central opening surrounded by an annular collar 141. The collar 141 surrounds a collar 142 which is provided at one end of a hollow shaft 144. The drum 16 is supported on a shoulder formed by the collar 142, and the end of the shaft extends into the opening of the bottom portion 118 in friction fit with that portion. Therefore, rotation of the hollow shaft 144 causes the drum 16 to rotate. Also, the interior of the hollow shaft 144 communicates with the interior of the drum.

Bearings 146 are provided at the opposite ends of the shaft 144. The inner races of these bearings are mounted on the shaft, and their outer races are disposed against bushings 148. The bushings are secured to a housing 150 by means of a plurality of studs 152.

An arcuate opening 156 is provided in the housing 150 between the bearings 146. This opening enables a drive belt 158 to extend into the housing and around a pulley 160. The pulley 160 is keyed to the shaft 144 between the bearings 146, and the pulley is held against axial movement by a pair of sleeves 162. In this way, the shaft 144 and the drum 16 can be rotated by a suitable motor (not shown), the motor being mechanically coupled to the pulley 160 by the drive belt 158.

The bearings 146 and the sleeves 162 are held on the shaft 144 by a nut 166. The nut 166 is screwed on a threaded portion at the bottom of the shaft, and a lock washer 164 is interposed between it and the lower bearing. A sealing disc 168 is also screwed on the threaded portion of the bottom of the shaft 144. The sealing disc 168 operates in conjunction with a bottom plate 170 to resist the movement of air between the interior of the housing 150 and the interior of the hollow shaft 144 when a pressure differential exists between the housing and the shaft.

The bottom plate 170 is secured to the housing 150 by a plurality of screws 172, and it has a central circular opening. A hollow conduit 174 extends into the opening in friction fit with the plate 170. The conduit 174 is axially aligned with the hollow shaft 144 so that air may be exhausted by a vacuum pump 176 from the hollow interiors of the shaft and the conduit. The vacuum pump 176 may be of any suitable known construction and, for that reason, is shown merely in block form.

The vacuum pump 176 draws air in through the orifices 122 and 124, through the interior of the drum 16, down the shaft 144 and through the conduit 174. This creates a vacuum pressure at the outer peripheral surface of the annular portion 120 of the lower section of the drum. This vacuum pressure serves to firmly retain the cards received from the card holder stations 10 and 12 on that surfave as such cards are transported by the drum between these two stations.

When the station 10 or the station 12 is conditioned to a feeding mode, it is desired that the cards fed from this station will pass in a one-by-one sequence to the periphery of the drum 16. This is achieved in the improved card holder station of the present invention by the provision of a tongue 200. The tongue 200, as shown in Figure 7, is secured to the leading edge of the trailing guide rail 34 of the station, and it extends from that leading edge to a position closely adjacent the peripheral surface of the drum 16. The tongue 200 is positioned intermediate the top and bottom edges of the guide rail 34. The outer end of the tongue 200 is spaced from the periphery of the drum 16 within precisely controlled tolerances by a distance corresponding to slightly more than the width of one information storage card but less than the width of two cards. Then, cards may be fed from the station 10, or from the station 12, by intermittently interrupting the vacuum pressure at the feed head 18 for a time sufficient to release one card only. Alternately, the vacuum pressure may be turned off for a longer interval, at which time the cards will be fed individually and in sequence past the tongue 200 and through the throat formed by that tongue and the periphery of the drum 16.

As clearly shown in Figure 7, the stack head 20 is provided with a slot or groove 202 which receives the tongue 200 as the stack head is moved forward to its operative position. This enables the stack head to close the throat and properly perform its arresting function when the station is conditioned to a stacking mode. The stack head has a width corresponding to the width of each card so that when it is moved to its operative position it arrests each card by exerting a force along the entire leading edge of such card. This obviates the wear that is created due to shearing stresses when the width of the stack head is less than that of the cards.

Copending application Serial No. 658,590 filed May 13, 1957 discloses and claims a sensing means which is adapted to be positioned adjacent the mouth of a card holding station to de-energize the apparatus in the presence of a jamming condition of the cards transported by the transporting drum. This sensing means response to the superimposing of one card over another on the periphery of the transporting drum, such superimposing indicating the tendency of the cards to jam. The card holder stations of the present invention may also be equipped with sensing instrumentalities for this purpose.

An improved sensing instrumentality of the type referred to above as shown in perspective as 212 in Figure 5, and the illustrated unit includes an insulating base 210. As shown in Figure 1, the instrumentality 212 can be mounted on the table top 11 adjacent the leading guide rail 32 of the station 10.

The instrumentality 212 includes an L-shaped bracket 214 of electrically conductive material, and this bracket is supported on the insulating base 210 by a screw 216 which exends through the bracket and into the base. A resilient electrically conductive strip 218 is supported in the bracket 214 by a block 219 and a screw 220. The screw 220 extends through the block 219 and is threaded into the bracket 214. The strip 218 extends between the block and the bracket and is held wedged between these elements by the screw 220. The screw 220 also serves as a terminal for an electric lead 222.

The strip 218 extends upwardly from the base 210 and supports an electrically conductive switch armature 224 at its upper end. The switch armature 224 has a bent-over end portion 226 which, as shown in Figure 1, extends into close proximity with the periphery of the drum 16. The spacing of the end portion 226 of the switch armature 224 and the drum 16 is made such that the switch armature is not actuated so long as one card at a time is transported by the drum past the armature. However, when one or more cards become superimposed upon another on the periphery of the drum, the superimposed cards contact the bent-over end portion 226 of the switch armature as they are transported past the armature, and these cards engage the armature and cause it to move in an angular manner about a pivot point defined by the strip 218.

The other end of the armature 224 extends between a U shaped bracket 228 which is supported on the base 210 by means of a plurality of screws such as the screw 230. An electric contact 232 is supported by the bracket 228, and this contact is engaged by the armature 224 when the armature is pivoted about the support 218 by the superimposed cards. A screw 234 extends into the contact 232 and forms a terminal connection for an electric lead 236.

Therefore, an electrical circuit is established between the leads 222 and 236 whenever a superimposed card pivots the armature 224 into engagement with the contact 232. The leads 222 and 236 may be conveniently connected to a circuit breaker to activate the breaker and de-energize the apparatus upon the occurrence of such a condition.

The invention provides, therefore, an improved card holder station for use in card processing apparatus. The improved card holder station of the invention enables a large number of cards to be held in the station in a generally stacked condition. Moreover, the improved card holder station of the invention permits cards to be fed smoothly into and out of the station without damage to the cards or to the equipment.

We claim:

1. In apparatus for processing data on a plurality of information storage cards, the combination of: transport means for the cards, card holding means disposed adjacent said transport means and including a card supporting surface and at least one guide rail, a tongue member extending from one end of the guide rail towards the transport means to define a throat for the cards fed from the card holding means to the transporting means, said tongue member being disposed intermediate the upper and lower edges of the guide rail to engage the leading edge of each card so fed to the transport means at a point intermediate the top and bottom thereof, and a stack head having a width corresponding to the width of each card for controlling the transfer of cards from the transport means to the card holding means, said stack head being movable between a standby position and an operative position and having a groove formed therein for receiving the tongue head in the operative position of the stack head to obtain a positioning of the cards in the card holding means for a sequential transfer of the cards from the card holding means to the transport means.

2. In apparatus for processing data on a plurality of information storage cards, the combination of: a rotatable vacuum pressure transporting drum for transporting cards at fixed intervals on its peripheral surface, a stationary card holder disposed adjacent the drum and including a card supporting surface and a pair of spaced guide rails, a movable feed head disposed adjacent one of the guide rails for controlling the transfer of cards from the card holder to the transporting drum, a tongue extending from one end of the other of the guide rails towards the peripheral surface of the transporting drum to define a throat for the cards fed from the card holder to the drum, said tongue being disposed intermediate the upper and lower edges of said other guide rail to engage the leading edge of each card so fed to the drum at a point intermediate the top and bottom thereof, and a stack head having a width corresponding to the width of each card for controlling the transfer of cards from the drum to the card holder, said stack head being movable between a standby position and an operative position and having a groove formed therein for receiving the tongue when the stack head is in its operative position.

3. In apparatus for processing data on a plurality of information storage cards, the combination of: transport means for the cards, card holding means disposed adjacent said transport means and including a card supporting surface, a pusher member disposed to move on the card supporting surface towards and away from the transport means to maintain the cards in the card holding means in a stacked condition, a rotatable member mounted on the pusher member, and a tapered resilient strip spring secured at one end to a stationary point in the card holding means and adapted to coil about the rotatable member, said tapered resilient strip serving to bias the pusher member towards the transport means with a force which increases with the distance of the pusher member from the transport means.

4. In apparatus for processing data on a plurality of information storage cards, the combination of: transport means for the cards, card holding means disposed adjacent said transport means and including a card supporting surface and a pair of spaced guide rails, a pusher member disposed to move on the card supporting surface between the guide rails towards and away from the transport means to main the cards in the card holding means in a stacked condition, a flat base member for the pusher member and made from a material to engage the card supporting surface in low frictional relationship for a free movement of the cards in a direction toward or away from the transport means, a bearing rotatably mounted on the pusher member, and a resilient strip secured at one end to a stationary point in the card holding means and disposed to coil about the bearing, said resilient strip serving to bias the pusher member towards the transport means.

5. In apparatus for processing data on a plurality of information storage cards, the combination of: transport means for the cards, card holding means disposed adjacent said transport means and including a card supporting surface, a movable feed head for controlling the transfer of cards from the card holding means to the transport means and having electrical contact means formed thereon, a pusher member including a shock absorbing pad disposed for movement on the card supporting surface towards and away from the transporting means to maintain the cards in the card holding means in a stacked condition, a flat base member for the pusher member and made from a material having a low frictional relationship for a free movement of the cards in the card holding means toward or away from the transport means, switch armature means carried by the pusher member for engagement with the contact means on the feed head when the card holding means is empty, a bearing rotatably mounted on the pusher member, and a tapered resilient strip secured at its narrow end to the underside of the card supporting surface and extending through a slot in said surface, said strip being disposed to coil about the bearing for biasing the pusher towards the transport means with a force which increases with the distance of the pusher from the transport means.

6. In apparatus for processing data on a plurality of information storage cards, the combination of: transport means for the cards, card holding means disposed adjacent said transport means, a movable feed head for controlling the transfer of cards from the card holding means to the transport means, said feed head having a surface disposed to engage a leading card in the card holding means, means for introducing a vacuum pressure to said surface of said feed head to retain the leading card against the same, and at least one resilient finger supported adjacent the surface of the feed head for movement by the leading card to an inoperative position below said surface in the presence of such vacuum pressure and for resilient displacement outwardly from said surface upon an interruption in such vacuum pressure.

7. In apparatus for processing data on a plurality of information storage cards, the combination of: transport means for the cards, card holding means disposed adjacent said transport means, a movable feed head for controlling the transfer of cards from the card holding means to the transport means, said feed head having a face composed of a material having slots therein and having properties of providing a high frictional relationship with the cards disposed against the face, said face being positioned to engage a leading card in the card holding means, means for introducing a vacuum pressure to said face of the feed head to retain the leading card against the same, and at least a pair of resilient fingers supported on said face of the feed head and made from a material to provide a low frictional relationship with the cards disposed against the fingers, said fingers being disposed for movement by the leading card into the slots in said face and below the surface of said face in the presence of said vacuum pressure and for resilient displacement outwardly from the face upon an interruption in said vacuum pressure.

8. In apparatus for processing data on a plurality of information storage cards, the combination of: transport means for the cards, a card holder disposed adjacent the transporting means and including a card supporting surface and a pair of spaced guide rails, a movable feed head disposed adjacent one of the guide rails for controlling the transfer of cards from the card holder to the transport means, said feed head having a face provided with slots therein and formed from a material to provide a high frictional relationship with the cards disposed against the face, said face being disposed to engage a leading card in the card holding means, means for introducing a vacuum pressure to said face of said feed head to retain the leading card against the same, at least one resilient finger secured to said face of the feed head and disposed for movement by the leading card to an inoperative position in said slots below the surface of said face in the presence of said vacuum pressure and for resilient displacement outwardly from the face upon the termination of such vacuum pressure and made from a material for providing a low frictional relationship with the cards disposed against the fingers, a tongue member extending from the ends of one of the guide rails toward the transport means to define a throat for the cards fed from the card holder to the transport means, said tongue being disposed intermediate the upper and lower edges of the last named guide rail to engage the leading edge of each card so fed to the transporting means at a point intermediate the top and bottom thereof, a stack head for controlling the transfer of cards from the transport means to the card holder and having a slot formed therein for receiving said tongue, a pusher member disposed for movement on the card supporting surface in the card holder in a direction towards or away from the transporting means to maintain the cards in the card holder in a stacked condition, a rotatable member mounted on the pusher, and a tapered resilient strip secured at its narrow end to a stationary point in the card holder and disposed to coil about the rotatable member to bias the pusher member toward the transporting means with a force which increases with the distance of the pusher member from the transporting means.

9. The combination defined in claim 8 which includes a switch armature resiliently mounted adjacent the mouth of the card holder in close proximity to said transporting means, said armature being disposed for movement from a first position to a second position upon the superimposing of one card over another on the transport means, and a switch contact means positioned to be engaged by the switch armature when the armature is in its second position.

10. In apparatus for processing data on a plurality of information storage cards, the combination of: card holding means constructed to hold cards in stacked relationship, means including transport means for the cards and disposed in coupled relationship to the card holding means to obtain a transfer of cards from the card holding means to the transport means in the same order as the disposition of the cards in the card holding means, retaining means disposed in coupled relationship to the leading card in the card holding means to exert a force in maintaining a card in the card holder and provided with a first surface of a high frictional coefficient and with a second surface of a low frictional coefficient, and means included in the retaining means for obtaining a disposition of the cards against the first surface upon the exertion of the retaining force to facilitate the retention of the cards in the card holding means and for obtaining disposition of the cards against the second surface upon an interruption in the retaining force to facilitate the withdrawal of cards from the card holding means.

11. In apparatus for processing data on a plurality of information storage cards, the combination of: a card holder including a pair of spaced guide rails for maintaining the cards in stacked relationship within the holder, movable transport means disposed in contiguous relationship to the card holder to obtain a withdrawal of cards from the card holder, means associated with the transport means for obtaining a movement of cards with the transport means upon the withdrawal of the cards from the card holder, retaining means disposed in coupled relationship to the trailing end of the leading card in the card holder and provided with at least one orifice for the exertion of a pneumatic force against the trailing end of this card to maintain the card in the card holder and provided with a first surface having a high frictional coefficient and provided with a second surface having a low frictional coefficient, and means included in the retaining means and controlled by the pneumatic force for obtaining a disposition of cards against the first surface upon the exertion of the retaining force to facilitate the retention of the cards in the card holder and for obtaining a disposition of cards against the second surface upon an interruption in the exertion of the retaining force to facilitate the removal of cards from the card holder.

12. In apparatus for processing data on a plurality of information storage cards, the combination of: a card holder constructed to hold a plurality of cards in stacked relationship, transport means for the cards and disposed in coupled relationship to the card holder for providing a transfer of cards between the card holder and the transport means, resilient means included in the card holder and provided with a length variable in accordance with the number of cards in the card holder for pressing the cards in the card holder against the transport means to maintain the cards in stacked relationship in the card holder and for exerting a substantially constant force against the cards first card in the card holder at the end near the transport means and for exerting such substantially constant force against the first card regardless of the number of cards in the card holder, and means included in the last mentioned means for facilitating transfers of cards to and from the card holder to vary the number of cards in the card holder.

13. In apparatus for processing data on a plurality of information storage cards, the combination of: a card holder including a pair of spaced guide rails for holding cards in stacked relationship, transport means disposed in contiguous relationship to the card holder for providing a transfer of cards between the transport means and the card holder, means associated with the transport means for obtaining a transport of cards upon a transfer of the cards from the card holder to the transport means, resilient means disposed in the card holder and having a variable length in accordance with the movement of cards in the card holder in accordance with the transfer of cards into and out of the card holder and disposed to press against the last card in the card holder in a direction for moving the cards toward the front of the card holder for transfer to the transport means and constructed to provide a substantially constant force on the card in the card holder disposed adjacent the transport means and to provide such a substantially constant force regardless of the number of cards in the station, and means disposed in cooperative relationship with the cards for providing a controlled transfer of cards between the card holder and the transport means.

14. In apparatus for processing data on a plurality of information storage cards, the combination of: transport means for the cards, card holding means disposed adjacent said transport means and including a card supporting surface and at least one guide rail, a tongue member extending from one end of the guide rail towards the transport means to define a throat for the cards fed from the card holding means to the transporting means, said tongue member being disposed intermediate the upper and lower edges of the guide rail to engage the leading edge of each card so fed to the transport means at a point intermediate the top and bottom thereof, a stack head having a width corresponding to the width of each card for controlling the transfer of cards from the transport means to the card holding means and having a groove therein for receiving the tongue member, retaining means disposed in coupled relationship to the leading card in the card holding means to exert a retaining force against such leading card, said retaining means being provided with a first surface of high frictional coefficient and with a second surface of low frictional coefficient, and means included in the retaining means for obtaining a disposition of the cards against the first surface upon the exertion of the retaining force and for obtaining a disposition of the cards against the second surface upon an interruption of the retaining force.

15. In apparatus for processing data on a plurality of information storage cards, the combination of: transport means for the cards, card holding means disposed adjacent said transport means for holding the cards in a stacked relationship and including a card supporting surface and at least one guide rail, a tongue member extending from one end of the guide rail towards the transport means to define a throat for the cards fed from the card holding means to the transporting means, said tongue member being disposed intermediate the upper and lower edges of the guide rail to engage the leading edge of each card so fed to the transport means at a point intermediate the top and bottom thereof, a stack head having a width corresponding to the width of each card for controlling the transfer of cards from the transport means to the card holding means and having a groove therein for receiving the tongue member, and means included in the card holding means for pressing the cards in the card holding means against the transport means to maintain the cards in stacked relationship in the card holding means and for exerting a substantially constant force against the leading card in the card holding means regardless of the number of cards in the card holding means wherein the leading card in the card holding means is the card closest to the transport means.

16. Apparatus as set forth in claim 14 in which means including a coiled resilient strip is disposed against the cards in the card holding means to press the cards toward the transport means and in which the resilient strip is disposed to become wound or unwound in accordance with the transfer of cards from the card holding means to the transport means or from the transport means to the card holding means and in which the resilient strip is tapered to maintain a substantially constant force against the leading card in the card holding means regardless of the number of cards in the card holding means where the leading card is the card adjacent to the transport means.

17. Apparatus as set forth in claim 15 in which a retainer is operative upon the cards in the card holding means to provide a controlled transfer of cards from the card holding means to the transport means and in which the retainer is provided with a first surface having a high coefficient of friction and is provided with a second surface having a low coefficient of friction and in which means are included to press the cards in the card holding means against the first surface for the retention of the cards in the card holding means and to press the cards in the card holding means against the second surface for a transfer of the cards from the card holding means to the transport means.

18. Apparatus as set forth in claim 17 in which the transport means are movable in closed loops and are constructed to retain the cards for movement with the transport means and in which the constant-force means include a tapered resilient strip having a coiled configuration and further include a pusher member pressed against the cards in the card holding means by the coiled strip regardless of the number of cards in the card holding means.

References Cited in the file of this patent

UNITED STATES PATENTS

| | | |
|---|---|---|
| 2,749,117 | Chew | June 5, 1956 |
| 2,804,301 | Beman | Aug. 27, 1957 |

UNITED STATES PATENT OFFICE

CERTIFICATE OF CORRECTION

Patent No. 2,947,538 August 2, 1960

Eric Azari et al.

It is hereby certified that error appears in the printed specification of the above numbered patent requiring correction and that the said Letters Patent should read as corrected below.

Column 12, line 31, for "main" read -- maintain --.

Signed and sealed this 11th day of April 1961.

(SEAL)
Attest:
ERNEST W. SWIDER
Attesting Officer

ARTHUR W. CROCKER
Acting Commissioner of Patents